(No Model.)

M. FLAMMANG.
PHOTOGRAPHIC PLATE HOLDER.

No. 384,835. Patented June 19, 1888.

Witnesses:
Geo. H. Potts,
Maurice J. Roach,

Inventor:
Mathias Flammang
by his att'ys
Gifford & Brown.

UNITED STATES PATENT OFFICE.

MATHIAS FLAMMANG, OF NEWARK, NEW JERSEY, ASSIGNOR TO THE SCOVILL MANUFACTURING COMPANY, OF NEW YORK, N. Y.

PHOTOGRAPHIC-PLATE HOLDER.

SPECIFICATION forming part of Letters Patent No. 384,835, dated June 19, 1888.

Application filed September 23, 1886. Serial No. 214,323. (No model.)

*To all whom it may concern:*

Be it known that I, MATHIAS FLAMMANG, of Newark, in the county of Essex and State of New Jersey, have invented a certain new and useful Improvement in Photographic-Plate Holders, of which the following is a specification.

I will describe in detail a photographic-plate holder embodying my improvement, and then point out the novel features in the claims.

Figure 1:
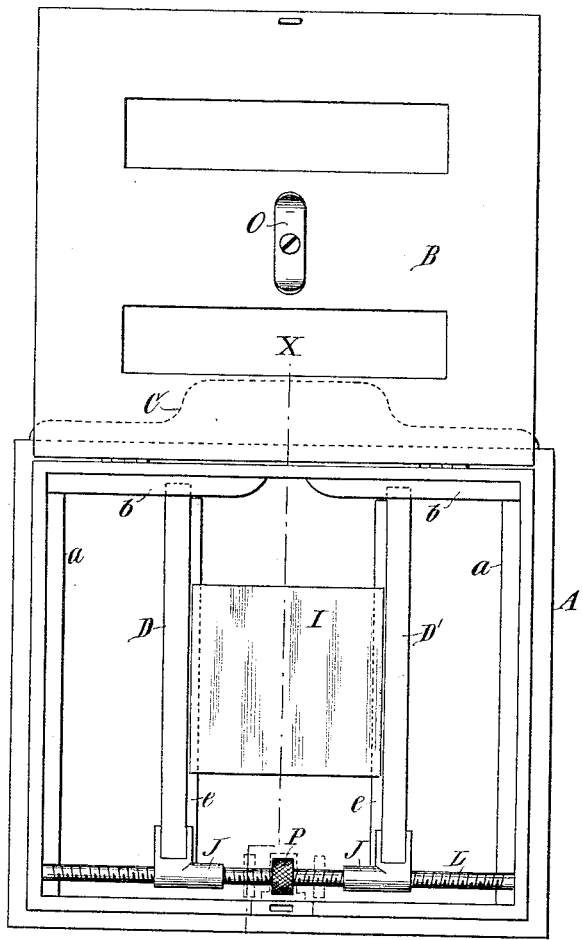
Figure 2:
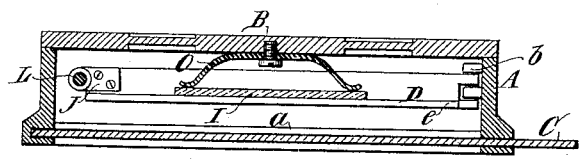

In the accompanying drawings, Figure 1 is a plan or top view of a photographic-plate holder embodying my improvement, a cover thereof being open. Fig. 2 is a transverse section thereof taken on the plane of the dotted line $x\ x$, Fig. 1.

Similar letters of reference designate corresponding parts in both figures.

A designates the plate-holder frame, and B the cover thereof, hinged thereto at one of its side edges. The frame is shown as approximately rectangular in shape.

C designates the usual slide or shutter, adapted to be slid in suitable slideways, $a$, at the back of the frame.

D D' designate movable jaws or grippers for a photographic plate, I. Near one of their ends these jaws extend into guideways $b$ on one of the inner edges of the frame. Such ends of the jaws may be slid along in the guideways. Upon the other ends of the jaws D D' are secured nuts J.

L designates a screw arranged on the interior of the frame A and journaled in side portions thereof. It extends at right angles to the lengths of the jaws D D' and through the nuts J, the latter being internally screw-threaded to receive them. The nuts J preferably have long bearings on the screw, so that the jaws will be maintained rigid throughout their lengths. A portion of the screw L is provided with a right-handed screw-thread and another portion with a left-handed screw-thread. Preferably each of said screw-threads will extend approximately throughout one-half the length of the screw. About midway in the length of the screw, and between the reversed screw-threads, a collar, P, is rigidly mounted on the screw. It will preferably be milled, and constitutes a hand-piece whereby the screw may be rotated. Of course the screw-threads of the nuts J correspond with those upon the screw with which they operate.

It will readily be seen that by rotating the screw the nuts J will be caused to travel toward or from each other, according to the direction in which the screw is rotated. This movement will cause the jaws D D' to travel toward and from each other.

Upon the sides of the jaws facing each other, and near the bottoms thereof, I have shown longitudinal ribs or ledges $e$. Upon these the plate rests. I have shown the plate so arranged.

The jaws are to be moved toward and from each other for the purpose of accommodating plates of different sizes. The jaws having been adjusted to the proper distance apart, the plate is placed upon the ribs $e$. By then rotating the screw slightly in the direction to bring the jaws nearer together they will be caused to tightly grip the plate and prevent its displacement. The jaws themselves are locked against sidewise movement, as the nuts cannot be moved along on the screw without rotating the latter.

Of course, if two screws were employed which might be rotated separately, the result would be practically the same, and the single screw which I show constitutes in effect two screws.

In Fig. 1 I have shown in dotted outline a bearing about midway in the length of the screw, in which two screws might be arranged. This arrangement would provide for adjusting the jaws independently of each other, so as to vary the relative relations which the jaws would bear to the center of the holder.

A spring, O, on the inner side of the cover serves to prevent longitudinal movement of the plate I when the cover is closed.

What I claim as my invention, and desire to secure by Letters Patent, is—

1. In a photographic-plate holder, the combination, with a frame, of movable jaws, a right-hand screw, a left-hand screw, a hand-piece between said screws for rotating the same, and nuts on the movable jaws having elongated bearings on the screws, substantially as and for the purpose specified.

2. In a photographic-plate holder, the combination, with a frame, of movable jaws, a right-hand screw, a left-hand screw, a bearing between said screws, a hand-piece, also between said screws, and nuts on the movable jaws having elongated bearings on the screws, substantially as and for the purpose specified.

MATHIAS FLAMMANG.

Witnesses:
ALEX. F. HAINES,
HENRY P. SEE, Jr.